United States Patent [19]

Kline

[11] 4,077,942

[45] Mar. 7, 1978

[54] BIS(4-ANILINOPHENOXY) ESTER ANTIOXIDANTS

[75] Inventor: Richard H. Kline, Cuyahoga Falls, Ohio

[73] Assignee: The Goodyear Tire & Rubber Company, Akron, Ohio

[21] Appl. No.: 751,494

[22] Filed: Dec. 17, 1976

[51] Int. Cl.$^2$ ............................................. C08K 5/36
[52] U.S. Cl. ....................... 260/45.85 S; 260/45.85 T; 560/15; 560/89; 560/152; 560/198
[58] Field of Search ................ 260/45.85 S, 45.85 T, 260/485 G, 475 P, 481 R, 470

[56] References Cited

U.S. PATENT DOCUMENTS 3,004,073  10/1961  Wismer et al. .................. 260/475 P
4,021,474  5/1977  Pawlak et al. .................. 260/475 P

FOREIGN PATENT DOCUMENTS 1,918,342  10/1969  Germany.
324,248  2/1972  U.S.S.R.
242,375  5/1971  U.S.S.R.

Primary Examiner—V. P. Hoke
Attorney, Agent, or Firm—F. W. Brunner; J. A. Rozmazjl; D. B. Little

[57] ABSTRACT

Compounds such as bis[1-(4-anilinophenoxy)-2-propyl] 4,7-dithiadecanedioate and [3-(4-anilinophenoxy)-2-hydroxypropyl] 4,7-dithiadecanedioate are provided by reactions between 4-anilinophenoxy alcohols and epoxides and a dicarboxylic acid. The bis(4-anilinophenoxy) ester products are useful as antioxidants in polymers.

15 Claims, No Drawings

BIS(4-ANILINOPHENOXY) ESTER ANTIOXIDANTS

BACKGROUND OF THE INVENTION

This invention relates to bis(4-anilinophenoxy) esters which offer protection to polymers, both saturated and unsaturated, vulcanized and unvulcanized, against the deleterious effects of oxygen. It also relates to methods for preparation and use of these materials and to the compositions formed by mixing these materials with polymers.

Phenolic amides have been used in the rubber chemicals field as age resistors and antihardeners. Some of the patents disclosing such compounds are: U.S. Pat. Nos. 3,975,414; 3,658,769; 3,767,628; 3,867,334; and 3,679,744.

SUMMARY OF THE INVENTION

The objects of this invention are: (1) to provide bis(4-anilinophenoxy) esters for the protection of polymers against degradation by oxygen; (2) to provide polymers stabilized against oxygen attack; and (3) to provide a process of preparing said bis(4-anilinophenoxy) esters.

Other objects will become apparent as the description proceeds.

The objects of the present invention are accomplished by the preparation and use as antioxidants in polymers of bis(4-anilinophenoxy) esters having the following structural formula:

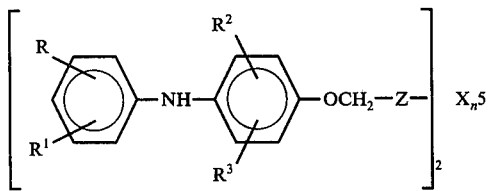

wherein R and $R^1$ are selected from the group consisting of H, alkyl radicals having 1 to 4 carbons and alkoxy radicals having 1 to 4 carbons; wherein Z is selected from the group consisting of

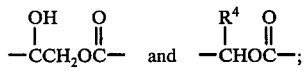

wherein $R^2$, $R^3$ and $R^4$ are selected from the group consisting of H and alkyl radicals having from 1 to 4 carbons (1-4C); wherein X is selected from the group consisting of alkylene radicals (1-22C), 1,4 phenylene, and

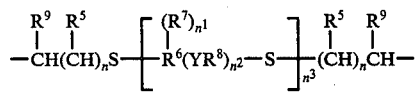

wherein $R^5$ and $R^9$ are selected from the group consisting of H and alkyl radicals (1-4C); wherein $R^6$ is selected from the group consisting of alkylene radicals having 1 to 6 carbons, cycloalkylene radicals having 5 to 12 carbons and $-R^{11}-R^{10}-(R^{12})_n4-$; wherein $R^{10}$ is selected from the group consisting of cycloalkylene radicals having 5 to 12 carbons and $R^{11}$ and $R^{12}$ are selected from the group consisting of alkylene radicals having 1 to 6 carbons, $n^4$ equals 0 or 1; $R^7$ is selected from the group consisting of alkyl radicals having 1 to 4 carbons; $R^8$ is selected from the group consisting of alkylene radicals having 1 to 6 carbons; Y equals —O—, —S— or 1,4phenylene; wherein $n$, $n^2$, $n^3$ and $n^5$ equals 0 or 1 and $n^1$ equals 0 to 4. In the preferred embodiments R and $R^1$ are H.

The compounds of the present invention are obtained by reaction between a 4-anilinophenoxy alcohol or a 4-anilinophenoxy epoxide and a dicarboxylic acid. The antioxidant compounds of the present invention are incorporated in organic materials susceptible to oxidative deterioration in order to retard such deterioration.

The following list of compounds is present to illustrate, not limit, the compounds of this invention:
Compound Number
1. Bis [3-(4-anilinophenoxy)-2-hydroxypropyl] 4,7-dithiadecanedioate.
2. Bis [3-(4-anilinophenoxy)-2-hydroxypropyl] 4,7-dithia-5-methyldecanedioate.
3. Bis [3-(4-anilinophenoxy)-2-hydroxypropyl] 3,3$^1$ thiodipropionate.
4. Bis [1-(4-anilinophenoxy)-2-propyl] 4,7-dithiadecanedioate.
5. Bis [1-(4-anilinophenoxy)-2-propyl] 4,7-dithia-5-methyldecanedioate.
6. Bis [1-(4-anilinophenoxy)-2-propyl] 3,3$^1$-thiodipropionate.
7. Bis [1-(4-anilinophenoxy)-2-propyl] nonanedioate.
8. Bis [1-(4-anilinophenoxy)-2-propyl] hexanedioate.
9. Bis [1-(4-anilinophenoxy)-2-propyl] butanedioate.
10. Bis [2-(4-anilinophenoxy) ethyl] 3,3$^1$-thiodipropionate.
11. Bis [1,-(4-anilino-2-methylphenoxy)-2-propyl] 3,3$^1$-thiodipropionate.
12. Bis [1-(4-(4-methylanilino) phenoxy)-2-propyl] 3,3$^1$-thiodipropionate.
13. Bis [1-(4-(4-methoxyanilino) phenoxy)-2-propyl] 3,3$^1$-thiodipropionate.
14. Bis [3-(4-anilinophenoxy)-2-hydroxypropyl] hexanedioate.
15. Bis [3-(4-anilino-2-methylphenoxy)-2-hydroxypropyl] 3,3$^1$-thiodipropionate.
16. Bis [3-(4-(4-methylanilino)phenoxy)-2-hydroxypropyl] 3,3$^1$-thiodipropionate.
17. Bis [1-(4-anilinophenoxy)-2-propyl] terephthalate.
18. Bis [1-(4-anilino-2-methylphenoxy)-2-propyl] hexanedioate.
19. Bis [1-(4-anilino-2-methylphenoxy)-2-propyl] 4,7-dithiadecanedioate.
20. Bis [2-(4-anilinophenoxy)ethyl] 4,7-dithiadecanedioate.

All of the above listed compounds except 17 have been prepared. The preferred compounds are numbers 6,8,10 and 11.

PREFERRED EMBODIMENTS OF THE INVENTION

The bis(4-anilinophenoxy) esters of this invention are prepared by a reaction between a 4-anilinophenoxy alcohol or a 4-anilinophenoxy epoxide and a dicarboxylic acid. The dicarboxylic acid may be an aliphatic dicarboxylic acid, a phthalic acid or a sulfur containing dicarboxylic acid of the structure HOOC — X — COOH (X is as defined earlier in the Summary).

Illustrative examples of epoxypropoxydiphenylamines which can be used are: 4-(2,3-epoxypropoxy)

diphenylamine and 4-(2,3-epoxypropoxy)-3-methyl diphenylamine.

Illustrative examples of hydroxethers of diphenylamine which can be used are: 1-(4-anilinophenoxy)-2-propanol and 2-(4-anilinophenoxy) ethanol.

Illustrative examples of aliphatic dicarboxylic acids which may be used are: adipic acid, succinic acid, dimethylglutaric acid, and oxalic acid.

Illustrative examples of sulfur containing dicarboxylic acids which may be used are: 4,7-dithiadecanedioic acid, 4,7-dithia-5-methyldecanedioic acid and 3,3'-thiodipropionic acid.

Illustrative examples of phthalic acids which may be used are: isophthalic acid and terephthalic acid.

When an epoxypropoxydiphenylamine is used as a reactant, certain antioxidants of this invention can be synthesized by cleavage of the epoxide by a dicarboxylic acid which may or may not contain sulfur. This reaction is best carried out by heating an epoxypropoxydiphenylamine with a dicarboxylic acid in an inert solvent in the presence of a tertiary amine or a quaternary ammonium salt.

Examples of solvents which may be used are: carbon tetrachloride, dichloromethane, chloroform, benzene, and perchloroethylene.

Examples of quaternary ammonium salts which may be used are tetrabutyl ammonium chloride or bromide. Examples of tertiary amines which may be used are triethylamine, tributylamine, tripropylamine and pyridine.

The reactants are preferably charged in stoichiometric amounts. When a quaternary ammonium salt is used, it may be charged in a ratio of 0.01 to 0.1 moles per mole of epoxypropoxydiphenylamine. When a tertiary amine is used, it may be charged in a ratio of 0.1 to 1 mole per mole of epoxypropoxydiphenylamine.

The epoxide cleavage reaction is illustrated by the following three examples, which are not to be considered as limiting the invention.

EXAMPLE I

Eighteen grams of 4-(2,3-epoxypropoxy) diphenylamine and 8.95 grams of 4,7-dithiadecanedioic acid were heated at reflux for 8 hours in 75 milliliters of carbon tetrachloride containing 7.5 grams of triethylamine. After cooling, the solvent was decanted from the viscous oil which had precipitated. The oil was dissolved in a mixture of tetrahydrofuran and benzene and the solution was washed well with dilute hydrochloric acid. The layers were separated and solvent was removed from the organic layer in a rotary evaporator. There was obtained 24 grams of a dark, waxy solid which was identified as bis[3-(4-anilinophenoxy)-2-hydroxypropyl] 4,7-dithiadecanedioate by means of its NMR spectrum.

EXAMPLE II

The use of 9.5 grams of 4,7-dithia-5-methyldecanedioic acid in place of the 4,7-dithiadecanedioic acid in the procedure described in Example I resulted in the isolation of 23.5 grams of a black viscous oil. The NMR spectrum of the oil showed it to be bis [3-(4-anilinophenoxy)-2-hydroxypropyl] 4,7-dithia-5-methyldecanedioate.

EXAMPLE III

Substitution of 6.7 grams of 3,3'-thiodipropionic acid for the 4,7-dithiadecanedioic acid in Example 1 yielded 21 grams of a dark viscous oil. This material was identified as bis [3-(4-anilinophenoxy)-2-hydroxypropyl] 3,3'-thiodipropionate through its NMR spectrum.

When a hydroxether of diphenylamine is used as a reactant, certain antioxidants of this invention can be synthesized by the acid catalyzed esterification of the hydroxether of diphenylamine with a dicarboxylic acid, which may or may not contain sulfur. Preferably, the reaction is carried out in a high boiling water immiscible solvent at the boiling point of the solvent.

Examples of solvents which can be used are: cumene, xylene, ethylbenzene, and tetralin.

Acid catalysts which may be used are exemplified by but not limited to: sulfuric acid, toluenesulfonic acid, benzenesulfonic acid, and phosphoric acid.

Reactants are preferably charged in stoichiometric amounts with 0.01 to 0.1 moles of acid catalyst used per mole of hydroxether or diphenylamine.

The esterification reaction is illustrated by Examples IV through VI. Unless otherwise stated, percentages are weight percent and parts are parts by weight.

EXAMPLE IV

A mixture of 24.3 grams of 1-(4-anilinophenoxy)-2-propanol, 11.9 grams of 4,7-dithiadecanedioic acid, and 1.5 grams of toluenesulfonic acid in 75 milliliters of xylene was heated at reflux for 16 hours. A solution of 2 grams of sodium carbonate in 20 milliliters of water was added to the reaction mixture. After vigorous stirring, the mixture was allowed to settle and the layers were separated. The solvent was removed from the organic layer in a rotary evaporator leaving 25 grams of a dark viscous liquid. This material was identified as bis [1-(4-anilinophenoxy)-2-propyl] 4,7-dithiadecanedioate by means of its NMR spectrum.

EXAMPLE V

When 12.6 grams of 4,7-dithia-5-methyldecandioic acid was substituted for 4,7-dithiadecanedioic acid in the procedure described in Example I and the reaction mixture was heated at reflux for 30 hours, there was obtained 36.5 grams of a dark viscous liquid. The NMR spectrum of this material identified it as bis [1-(4-anilinophenoxy)-2-propyl] 4,7-dithia-5-methyl-decanedioate.

EXAMPLE VI

Substitution of 8.9 grams of 3,3'-thiodipropionic acid in the procedure described in Example I resulted in the formation of 26 grams of bis [1-(4-anilinophenoxy)-2-propyl] 3,3'-thiodipropionate, also identified through its NMR spectrum.

Using the procedure described above with dicarboxylic acids not containing sulfur, compounds 7 through 9 and 18 were prepared.

The compounds of the present invention are useful as stabilizers of organic materials which are subject to oxidative deterioration. Such materials include: vulcanized and unvulcanized polymers such as natural rubber, balata gutta percha and synthetic diene polymers. Representative examples of the synthetic polymers used in the practice of this invention are homopolymers of a conjugated, 1,3-dienes such as isoprene and 1,3-butadiene as well as copolymers of conjugated 1,3-dienes with up to 60 percent by weight of at lease one copolymerizable monomer such as styrene or acrylonitrile.

The precise amount of antioxidant employed will depend on the polymer and the conditions to which it will be exposed.

In general, the antioxidants of this invention are employed in amounts from 0.005 to 10 parts per 100 parts of rubber. An advantageous concentration is one part per 100 parts of rubber.

Addition of these antioxidants to polymers may be by any of the conventional methods, for example, direct addition to solid compound in a mill or addition to the emulsion or solution form of the polymer.

Compounds 1 through 11 and 14 and 15 have been tested in SBR 1006. The tested compounds were each mixed with a benzene solution of SBR-1006 at a concentration of one part per 100 parts of rubber. Oxygen absorption tests were made on the films obtained by evaporation of the benzene. The testing procedure is of the type described in further detail in *Industrial and Engineering Chemistry*, Vol. 43, page 456 (1951) and *Industrial and Engineering Chemistry*, Vol. 45, p. 392 (1953). The results are shown in Table 1:

TABLE 1

| Compound | Hours to Absorb 1% Oxygen at 100° C. SBR-1006 |
|---|---|
| 1 | 482 |
| 2 | 578 |
| 3 | 582 |
| 4 | 640 |
| 5 | 628 |
| 6 | 604 |
| 7 | 580 |
| 8 | 692 |
| 9 | 604 |
| 10 | 698 |
| 11 | 789 |
| 14 | 414 |
| 15 | 659 |
| Commercial Antioxidant | 299 |

Had no antioxidant been present, the SBR would have absorbed 1.0% $O_2$ in 5 to 10 hours.

While certain representative embodiments and details have been shown for the purpose of illustrating the invention, it will be apparent to those skilled in this art that various changes and modifications may be made therein without departing from the spirit or scope of the invention.

What is claimed is:

1. A compound having the following structural formula:

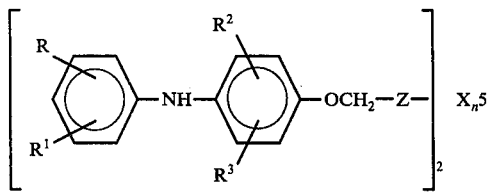

wherein R and $R^1$ are selected from the group consisting of H, alkyl radicals having 1 to 4 carbons and alkoxy radicals having 1 to 4 carbons; wherein Z is selected from the group consisting of

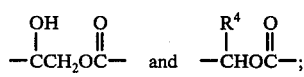

wherein $R^2$, $R^3$, and $R^4$ are selected from the group consisting of H and alkyl radicals having from 1 to 4 carbons (1-4C); wherein X is selected from the group consisting of alkylene radicals (1-22C), 1,4phenylene, and

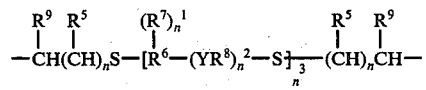

wherein $R^5$ and $R^9$ are selected from the group consisting of H and alkyl radicals (1-4C); wherein $R^6$ is selected from the group consisting of alkylene radicals having 1 to 6 carbons, cycloalkylene radicals having 5 to 12 carbons and $-R^{11}-R^{10}-(R^{12})_n4-$; wherein $R^{10}$ is selected from the group consisting of cycloalkylene radicals having 5 to 12 carbons and $R^{11}$ and $R^{12}$ are selected from the group consisting of alkylene radicals having 1 to 6 carbons, $n^4$ equals 0 or 1; $R^7$ is selected from the group consisting of alkyl radicals having 1 to 4 carbons; $R^8$ is selected from the group consisting of alkylene radicals having 1 to 6 carbons; Y equals —O—, —S— or 1,4-phenylene; wherein $n$, $n^2$, $n^3$ and $n^5$ equal 0 or 1 and $n^1$ equals 0 to 4.

2. The compound according to claim 1 wherein R and $R^1$ are H.

3. The compound according to claim 2 wherein Z is

4. The compound according to claim 2 wherein Z is

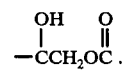

5. The compound according to claim 3 wherein X is the group $-CH_2CH_2SCH_2CH_2-$, $R^4$ is selected from the group consisting of methyl and H, and $n^5$ equals 1.

6. The compound according to claim 5 which is bis [1(4-anilino-2-methylphenoxy)-2-propyl] 3,3' thiodipropionate.

7. The compound according to claim 3 which is bis [1-(4-anilinophenoxy)-2-propyl] nonanedioate.

8. A diene polymer susceptible to oxidative degradation having incorporated therein a compound according to claim 1.

9. A diene polymer susceptible to oxidative degradation having incorporated therein a compound according to claim 2.

10. A diene polymer susceptible to oxidative degradation having incorporated therein a compound according to claim 3.

11. A diene polymer susceptible to oxidative degradation having incorporated therein a compound according to claim 4.

12. A polymer which is comprised of at least 40 weight percent of a conjugated diene monomer selected from the group consisting of isoprene; 1,3-butadiene; 2-chlorobutadiene-1,3; 2-ethylbutadiene-1,3 and 2,3-dimethylbutadiene-1,3 and having incorporated therein a compound according to claim 3 at a concentration of 0.005 to 10 parts per 100 parts rubber.

13. A polymer comprised of at least 40 weight percent of a conjugated diene monomer selected from the group consisting of isoprene; 1,3-butadiene; 2-chlorobutadiene-1,3; 2-ethylbutadiene-1,3 and 2,3-dimethylbutadiene-1,3 and having incorporated therein a compound according to claim 5 at a concentration of 0.005 to 10 parts per 100 parts rubber.

14. A polymer comprised of at least 40 weight percent of a conjugated diene monomer selected from the group consisting of isoprene; 1,3-butadiene; 2-chlorobutadiene-1,3; 2-ethylbutadiene-1,3 and 2,3-dimethylbutadiene-1,3 and having incorporated therein a compound according to claim 6 at a concentration of 0.005 to 10 parts per 100 parts rubber.

15. A polymer comprised of at least 40 weight percent of a conjugated diene monomer selected from the group consisting of isoprene; 1,3-butadiene; 2-chlorobutadiene-1,3; 2-ethylbutadiene-1,3 and 2,3-dimethylbutadiene-1,3 and having incorporated therein a compound according to claim 7 at a concentration of 0.005 to 10 parts per 100 parts rubber.

* * * * *